US009864148B1

(12) United States Patent
Ishikawa

(10) Patent No.: US 9,864,148 B1
(45) Date of Patent: Jan. 9, 2018

(54) OPTICAL ARRANGEMENT FOR SUPPRESSING OUTERBAND CROSSTALK IN A WAVELENGTH SELECTIVE SWITCH

(71) Applicant: Nistica, Inc., Bridgewater, NJ (US)

(72) Inventor: Takaaki Ishikawa, Tokyo (JP)

(73) Assignee: Nistica, Inc., Bridgewater, NJ (US)

( * ) Notice: Subject to any disclaimer, the term of this patent is extended or adjusted under 35 U.S.C. 154(b) by 0 days.

(21) Appl. No.: 15/400,360

(22) Filed: Jan. 6, 2017

(51) Int. Cl.
G02B 6/26 (2006.01)
G02B 6/42 (2006.01)
G02F 1/13 (2006.01)
G02B 6/35 (2006.01)
G02F 1/313 (2006.01)
G02B 5/30 (2006.01)
G02B 27/28 (2006.01)
(Continued)

(52) U.S. Cl.
CPC ............ G02B 6/35 (2013.01); G02B 5/3083 (2013.01); G02B 27/283 (2013.01); G02F 1/1313 (2013.01); G02F 1/13363 (2013.01); G02F 1/3134 (2013.01); G02F 1/31 (2013.01); G02F 2203/055 (2013.01); G02F 2203/07 (2013.01); G02F 2203/50 (2013.01)

(58) Field of Classification Search
CPC ............... G02B 6/264; G02B 6/29302; G02B 6/29371; G02B 6/35; G02B 6/354; G02B 6/3594; G02B 27/10; G02B 27/1006; G02B 27/46; G02B 5/18; G02B 5/3083; G02B 27/283; G02F 1/011; G02F 1/09; G02F 1/1313; G02F 1/1326; G02F 1/13363; G02F 1/13328; G02F 1/31; G02F 1/3134

USPC ....... 385/16–24, 37; 349/196, 202; 359/290, 359/566
See application file for complete search history.

(56) References Cited

U.S. PATENT DOCUMENTS 9,019,612 B2 * 4/2015 Wagener ............ G02B 27/1006 359/279
2008/0181559 A1 7/2008 Corem et al.
(Continued)

FOREIGN PATENT DOCUMENTS

WO 2016056534 A1 4/2016
WO 2016085847 A1 6/2016

Primary Examiner — Akm Enayet Ullah
Assistant Examiner — Michael Mooney
(74) Attorney, Agent, or Firm — Stuart H. Mayer; Mayer & Williams PC

(57) ABSTRACT

An optical device includes at least three optical ports. An optical arrangement arranges an optical beam received from any of the optical ports into a first polarization state. A dispersion element spatially separates the optical beam into a plurality of wavelength components. An optical power element converges each wavelength component in at least one direction. A programmable optical phase modulator steers the wavelength components through the optical arrangement, the dispersion element and the focusing element to a selected optical output. The programmable optical phase modulator includes an active area that performs the steering and a non-active area surrounding the active area. A polarizing arrangement located in an optical path between at least one of the optical ports and at least a portion of the non-active area of the programmable optical phase modulator is configured to arrange optical energy into a second polarization state orthogonal to the first polarization state.

14 Claims, 11 Drawing Sheets

(51) Int. Cl.
*G02F 1/13363* (2006.01)
*G02F 1/31* (2006.01)

(56) References Cited

U.S. PATENT DOCUMENTS

2010/0214527 A1  8/2010  Yue et al.
2015/0208143 A1  7/2015  Frisken

* cited by examiner

OPTICAL ARRANGEMENT FOR SUPPRESSING OUTERBAND CROSSTALK IN A WAVELENGTH SELECTIVE SWITCH

BACKGROUND

In an optical communication network, optical signals having a plurality of optical channels at individual wavelengths (i.e., channels), are transmitted from one location to another, typically through a length of optical fiber. An optical cross-connect module allows switching of optical signals from one optical fiber to another. A wavelength-selective optical cross-connect, or wavelength selective switch (WSS), allows reconfigurable wavelength-dependent switching, that is, it allows certain wavelength channels to be switched from a first optical fiber to a second optical fiber while letting the other wavelength channels propagate in the first optical fiber, or it allows certain wavelength channels to be switched to a third optical fiber. An optical network architecture based on wavelength-selective optical switching has many attractive features due to the ability to automatically create or re-route optical paths of individual wavelength channels. It accelerates service deployment, accelerates rerouting around points of failure of an optical network, and reduces capital and operating expenses for a service provider, as well as creating a future-proof topology of the network.

Wavelength selective switches may exhibit undesirable optical coupling between their various input and output ports. Another undesirable feature that may arise is outerband crosstalk.

SUMMARY

In accordance with one aspect of the subject matter discussed herein, an optical device is provided that includes at least three optical ports. An optical arrangement arranges an optical beam received from any of the optical ports into a first polarization state. A dispersion element spatially separates the optical beam into a plurality of wavelength components. An optical power element converges each of the plurality of wavelength components in at least one direction. A programmable optical phase modulator receives the focused plurality of wavelength components in the first polarization state. The programmable optical phase modulator is configured to steer the wavelength components through the optical arrangement, the dispersion element and the focusing element to a selected one of the optical outputs. The programmable optical phase modulator includes an active area that performs the steering and a non-active area surrounding the active area. A polarizing arrangement is located in an optical path between at least one of the optical ports and at least a portion of the non-active area of the programmable optical phase modulator. The polarizing arrangement is configured to arrange optical energy into a second polarization state orthogonal to the first polarization state.

In accordance with another aspect of the subject matter discussed herein, an optical device is provided that includes an optical port array, an optical arrangement, a dispersion element, a focusing element and a programmable optical phase modulator. The optical port array has at least one optical input port for receiving an optical beam and a plurality of optical output ports. The optical arrangement allows optical coupling between the at least one optical input port and each of the optical output ports and prevents optical coupling between any one of the plurality of optical output ports and any other of the plurality of optical output ports. The dispersion element receives the optical beam from the at least one optical input after traversing the optical arrangement and spatially separating the optical beam into a plurality of wavelength components. The focusing element focuses the plurality of wavelength components. The programmable optical phase modulator receives the focused plurality of wavelength components. The modulator is configured to steer the wavelength components to a selected one of the optical outputs.

In accordance with another aspect of the subject matter disclosed herein, the optical arrangement is configured to selectively allow and prevent optical coupling between selected ports by discriminating among different polarization states of optical energy traversing therethrough. In particular, in some embodiments the optical arrangement is further configured to receive the optical beam in any polarization state and provide the optical beam to the dispersion element in a predetermined polarization state.

In one particular embodiment, the optical arrangement includes at least one walkoff crystal for spatially separating the optical beams received from any of the ports in optical port array into first and second optical components being arranged in first and second polarization states, respectively. The optical arrangement also includes a first composite half-wave plate for arranging the first optical components into the second polarization state and, optionally, a polarizer for transmitting optical energy in the second polarization state but not the first polarization state. This embodiment of the optical arrangement also includes a Faraday rotator and a second composite half-wave plate. The Faraday rotator and the second composite half-wave plate rotate the spatially separated optical beams received from the optical input port via the polarizer into the first polarization state and rotate the spatially separated optical beams received from the plurality of optical output ports into the second orthogonal polarization state.

DETAILED DESCRIPTION

As detailed below, an optical arrangement is provided which directionally couples one set of optical ports to a different set of optical ports such that optical ports within each of the sets are not optically coupled to any other optical port within its own set. The arrangement may be integrated with an optical device such as optical switch to achieve lower levels of optical coupling between ports.

Figure 1:
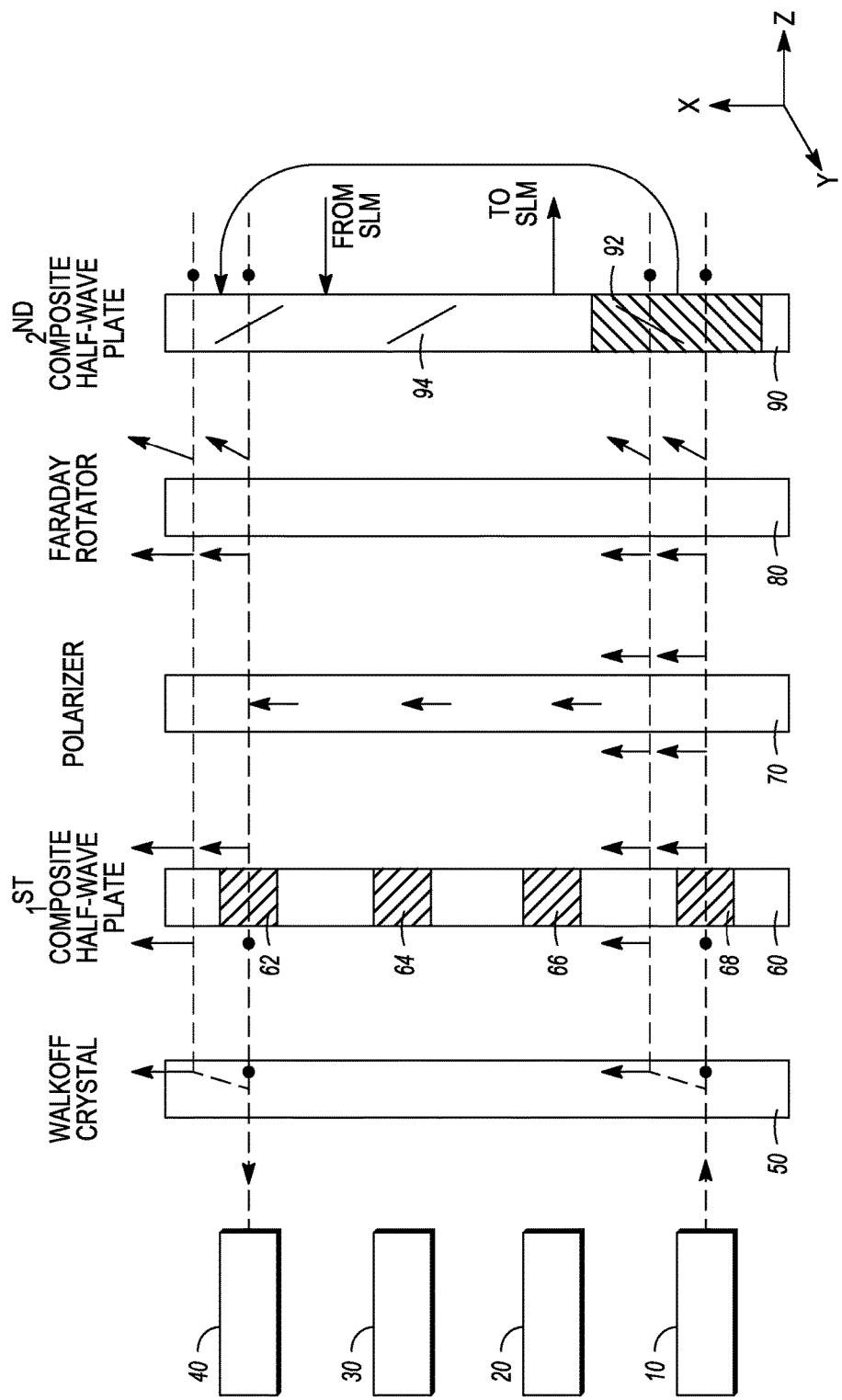
FIGS. 1-3 schematically illustrate a cross-sectional view of an optical arrangement that may be incorporated, for example, into a wavelength selective switch, as an optical beam is switched between different ones of the ports.

FIG. 1 schematically illustrates a cross-sectional view of an optical arrangement 100 that may be incorporated, for example, into a wavelength selective switch (WSS) for addressing the issues of diversity (the optical loss that occurs when a beam travels from one input port to another input port) and isolation (the optical loss that occurs when a beam travels from an output port to an input port). Four optical ports 10, 20, 30 and 40 are shown and thus in this example the wavelength selective switch in which the optical device 100 may be incorporated is a 1×3 switch. The optical arrangement 100 shown in FIG. 1 will allow the spatial light modulator to direct the optical beams between the Com port 10 and any of the optical ports 20, 30 and 40. More generally, any number n of optical ports may be employed to provide a 1×n switching functionality. Optical arrangement 100 includes a walkoff crystal 50, a first composite half-wave plate 60, a polarizer 70, a Faraday rotator 80 and a second composite half-wave plate 90, all of which are optically coupled as shown for processing optical beams that are received by optical port 10, which serves as a Com (common) port and selectively directed to any of the optical ports 20, 30 and 40.

In FIG. 1 two orthogonal states or components of an optical beam are shown as it propagates through the various optical elements. One polarization component (e.g., a vertical or v-component) is denoted by a vertical arrow, and the other polarization component (e.g., a horizontal or h-component) is denoted by a dot. The walk-off direction of walk-off crystal 50 and directions of rotation caused by the half-wave plates and Faraday rotator will be described with respect to polarization components of light beams propagating in the forward or downstream direction, i.e., positive z-direction.

An optical beam received by the Com port 10 propagates in the forward direction and enters walk-off crystal 50, which splits the optical beam into two orthogonally polarized beams that are spatially displaced with respect to one another. In the example of FIG. 1 this spatial displacement is in the x-direction. The optical beams exit the walk-off crystal 50 and enter a composite half-wave plate 60 having regions 62, 64, 66 and 68 that have their optical axes arranged to rotate the polarization of an incoming beam by 90°. The remaining regions of the composite half-wave plate 60 do not alter the polarization state of an incoming beam.

Half-wave plate regions 62, 64, 66 and 68 are positioned along the optical paths defined by the optical ports 40, 30, 20 and 10 respectively. The half-wave plate region 68 is positioned to receive the h-polarized component of the optical beam traveling from the Com port 10. As a consequence of the composite half-wave plate 60 the optical beams originating from the Com port 10 are both in the same polarization state (i.e., the v-polarization state).

The optical beams exit the composite half-wave plate 60 and enter an optional polarizer 70 though which only vertically polarized light passes. Accordingly, only the two spatially displaced optical beam components originating from the Com port 10 will pass through the polarizer 70.

After exiting the optional polarizer 70 the two vertically polarized optical beams originating from the Com port 10 enter a Faraday rotator 80. The Faraday rotator 80 rotates the polarization state of the optical beams by 45° in the clockwise direction when the optical beam is traveling in the downstream direction, as shown. A second composite half-wave plate 90 following the Faraday rotator 80 includes a first half-wave plate region 92 that receives the two spatially displaced optical beams from the Com port 10. The second half-wave plate 90 also includes a second half-wave plate region 94 that is positioned along the optical paths defined by the optical ports 40, 30 and 20. For two beams traveling in the same direction, the second half-wave plate region 94 is arranged to rotate the polarization state of the optical beams in the opposite direction from that of the first half-wave plate region 92.

The first half-wave plate region 92 receiving the optical beams from the Faraday rotator 80 further rotates the optical beams by another 45° in the clockwise direction so that they both exit the first half-wave plate region 92 in the h-polarization state. As shown, the net effect of the Faraday rotator 80 and the first half-wave region 92 is to output an optical beam in a horizontal polarization state if the input optical beam is in a vertical polarization state and output an optical beam in a vertical polarization state if the input optical beam is in a horizontal polarization state. That is, the Faraday rotator 80 and the first half-wave plate region 92 together rotate the polarization of a beam in one polarization state to its orthogonal polarization state. Moreover, the order in which the optical beam passes through the Faraday rotator 80 and the first half-wave plate region 92 may be reversed from that shown in FIG. 1.

After exiting the first half-wave plate region 92 the optical beams are directed further downstream through various other optical components and undergo optical processing by a spatial light modulator (not shown in FIG. 1). The spatial light modulator selectively directs various wavelength components of the optical beams to selected ones of the optical ports 20, 30 and 40. One example of a wavelength selective switch that incorporates a spatial light modulator and the optical arrangement shown in FIG. 1 will be presented below in connection with FIGS. 12A and 12B.

The optical arrangement 100 shown in FIG. 1 will allow the spatial light modulator to direct the optical beams between the Com port 10 and any of the optical ports 20, 30 and 40. However, the optical arrangement 100 will also block any optical beams originating from any of the optical ports 20, 30 and 40 which are directed to any of the ports 20 30 and 40 (e.g. an optical beam from optical port 20 will be prevented from reaching the optical port 30 or optical port 40).

Continuing with the example of FIG. 1, after exiting the $2^{nd}$ composite half-wave plate 90 and being redirected by the SLM, the optical beam originating from the Com port 10 that is directed by the SLM to optical port 40 will first pass through the second half-wave plate region 94 of the second composite half-wave plate 90 and the Faraday rotator 80 when traveling in the upstream direction. The net effect of the second half-wave plate region 94 and the Faraday rotator 80 is to output an optical beam in a horizontal polarization state if the input optical beam traveling in the upstream direction is in a vertical polarization state and output an optical beam in a vertical polarization state if the input optical beam is in a horizontal polarization state when traveling in the upstream direction. That is, the second half-wave plate region 94 and the Faraday rotator 80 together rotate the polarization of an upstream traveling optical beam in one polarization state to its orthogonal polarization state. Moreover, the order in which the optical beam passes through the second half-wave plate region 94 and the Faraday rotator 80 may be reversed from that shown in FIG. 1.

Since the optical beams traveling in the upstream direction from the SLM to the optical port 40 are in the h-polarization state upon entering the second half-wave plate region 94, they will exit the second half-wave plate region 94 and the Faraday rotator 80 in the orthogonal polarization state. That is, the optical beams will exit the second Faraday rotator 80 in the v-polarization state and thus will pass through the polarizer 70. The optical beams then pass through the composite half-wave plate 60, where the polarization of one the beams will be rotated into the h-polarization state by the half-wave plate region 62. The two beams, which are now in orthogonal polarization states, enter the walkoff crystal 50, which recombines the beams before they are directed to the optical port 40.

Figure 2:
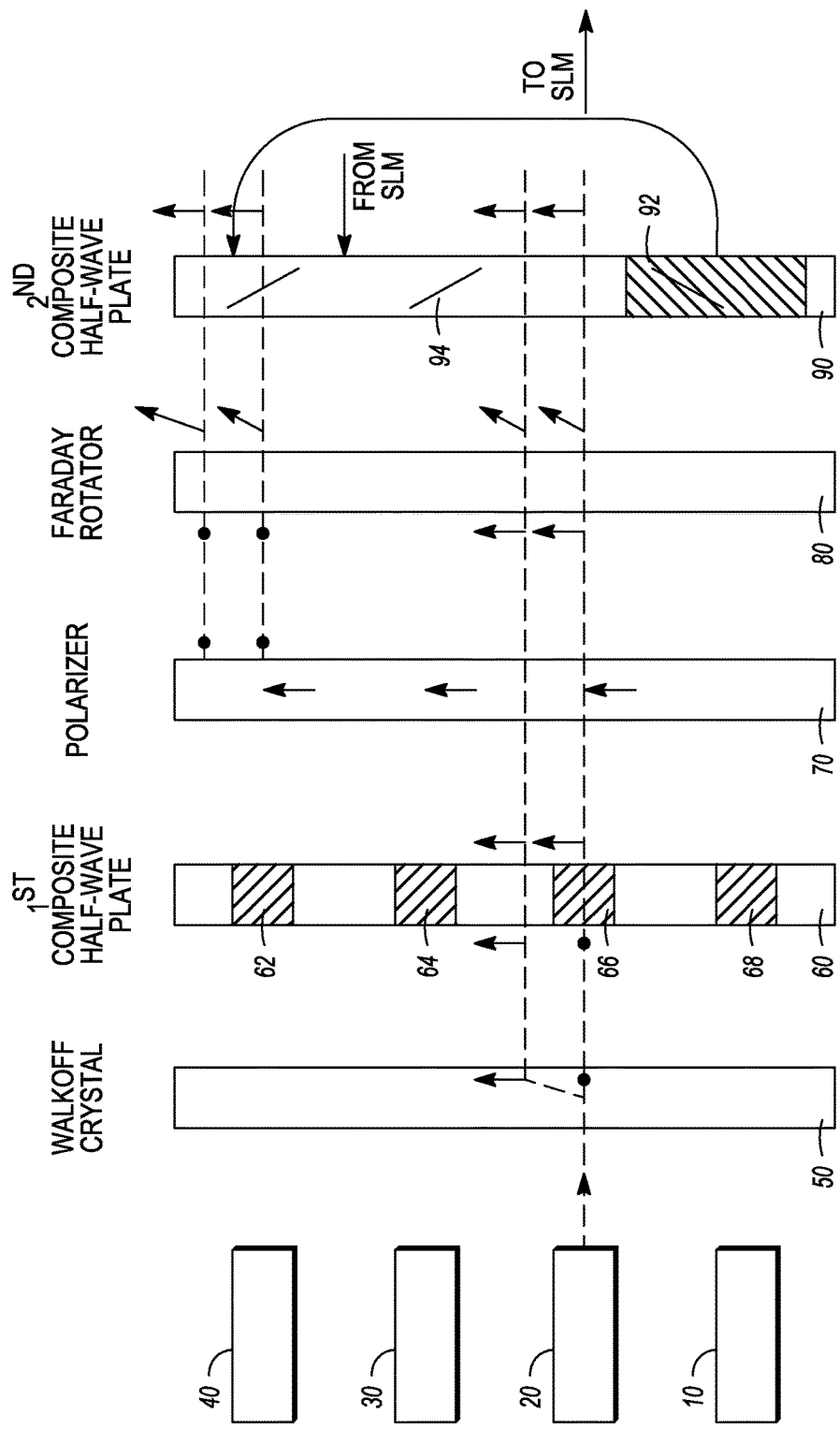

In contrast to an optical beam originating from Com port 10 and being directed to any of the optical ports 20, 30 and 40, an optical beam originating from any of the ports 20, 30 and 40 will be prevented from reaching any of the other ports 20, 30 and 40 by polarizer 70. That is, the optical arrangement 100 exhibits a high degree of directivity. This is illustrated in FIG. 2, where an optical beam originates from optical port 20 of the optical arrangement 100 and is prevented from reaching optical port 40 by polarizer 70. Likewise, FIG. 3 shows the optical arrangement 100 when an optical beam is successfully directed from optical port 40 to COM port 10, thereby illustrating that the optical arrangement 100 exhibits a high degree of isolation.

As previously mentioned, in some embodiments the polarizer 70 is not provided. Without the polarizer 70, the switching of an optical beam from COM 1 to say, port 40 will be unaffected. Likewise, the switching of an optical beam from port 40 to COM port 10 is unaffected. However, the manner in which an optical beam is prevented from being switched between any two of the output ports 20, 30 or 40, such as shown in 2 will be impacted.

Figure 4:
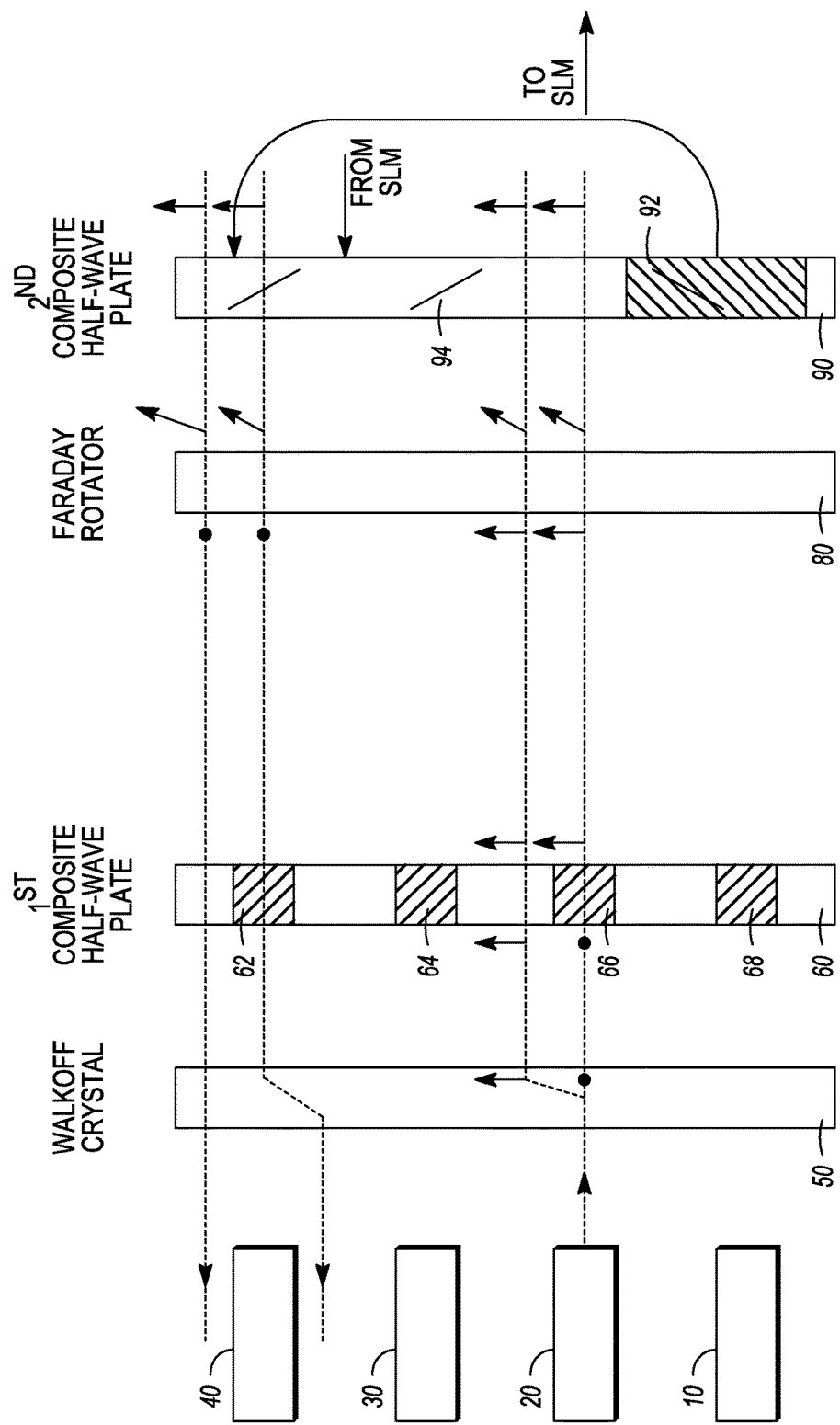
FIG. 4 shows an alternative embodiment of the optical arrangement shown in FIGS. 1-3.

Similar to FIG. 2, FIG. 4 shows the optical arrangement in which an optical beam is switched from port 20 to port 40, except that in FIG. 4 the polarizer 70 is not present. In FIG. 4 the optical beam travels through the optical arrangement as shown in FIG. 2 until it reaches the first composite half-wave plate 60. As shown, after each polarization component of the optical beam passes through the walkoff crystal 50, the beam will be directed to the optical port 40. However, instead of being directed along the optical axis of the port 40, the two polarization components will be displaced from the optical axis of the port and, assuming the spacing between adjacent ports is sufficient, the two polarizations will both miss port 40 and any adjacent ports. In this way coupling between ports 20 and 40 is prevented.

Figure 3:
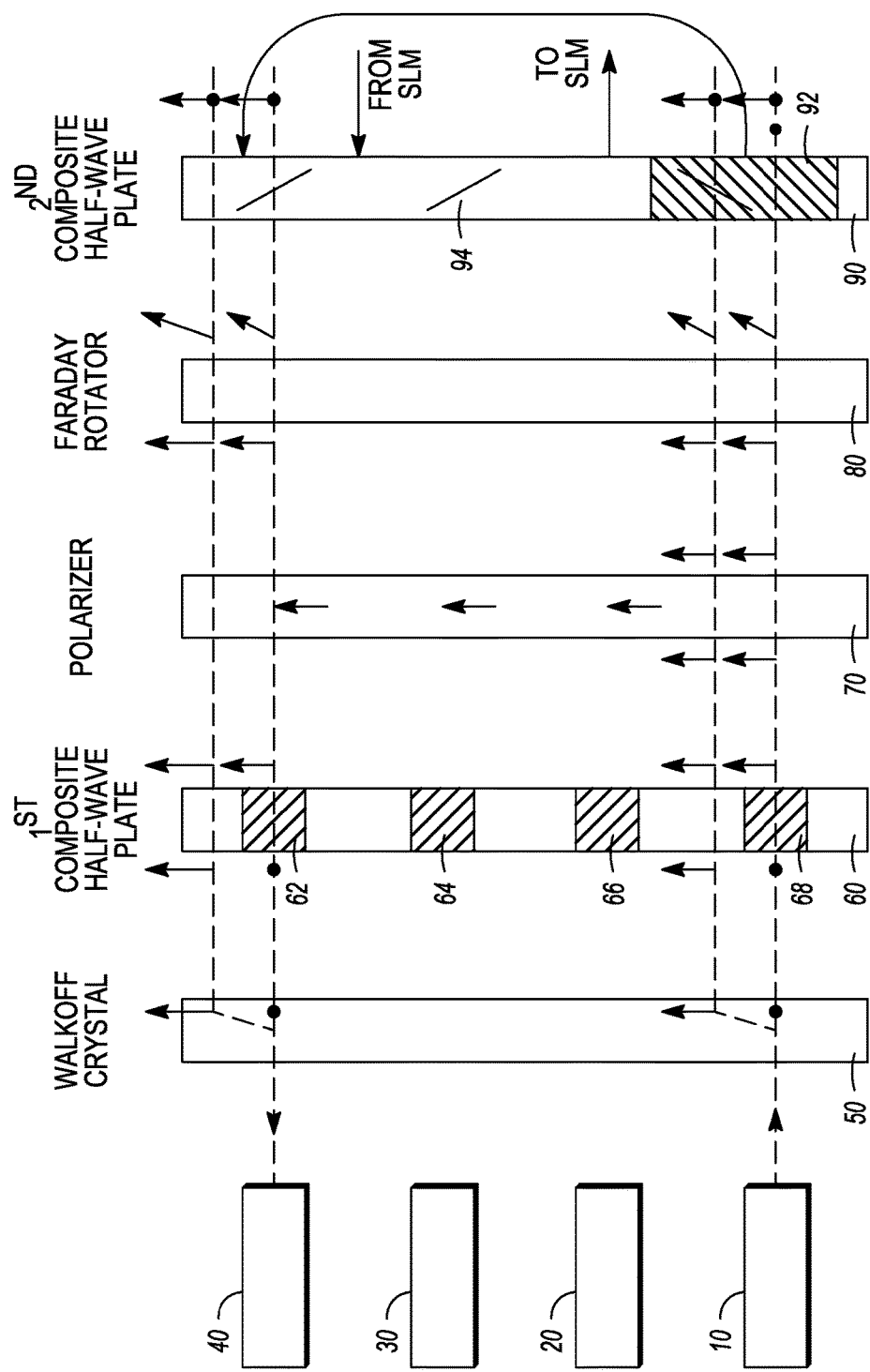
Figure 5:
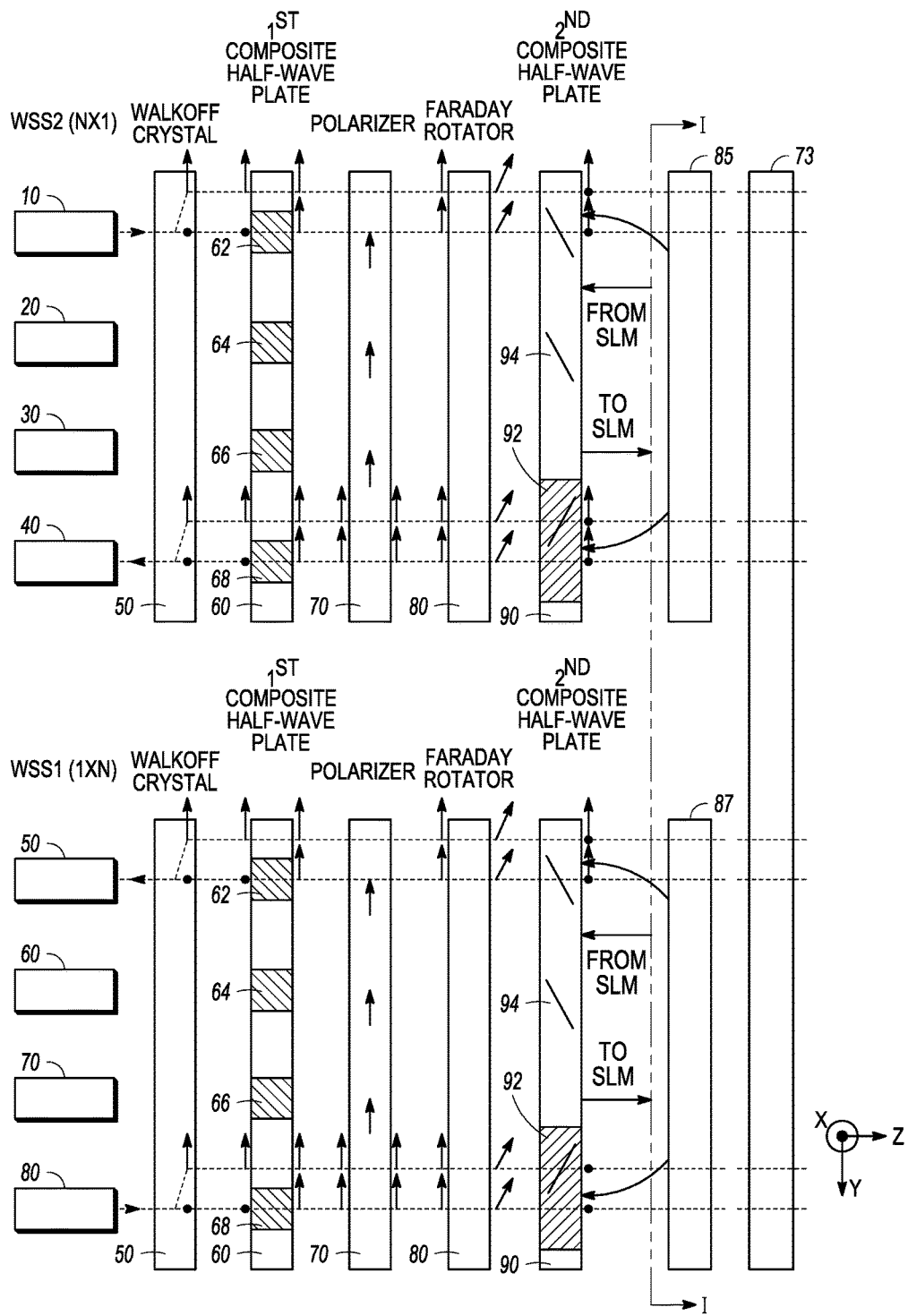
FIG. 5 shows another alternative embodiment of the optical arrangement shown in FIGS. 1-3.

FIG. 5 shows another alternative embodiment of the optical arrangement shown in FIGS. 1-3. In this embodiment the functionality of two independently operable wavelength selective switches are provided. In FIGS. 1-3 and 5, as well as in the remaining figures herein, like elements are denoted by like reference numerals. However, the optical ports associated with both the first and second WSSs may share a common set of such optical elements. The two switches can share a common set of optical elements such as lenses, dispersion elements and a spatial light modulator. That is, the functionality of the two WSSs may be incorporated into a single physical switching device. For purposes of illustration in this example 8 optical ports are shown. Optical ports 10, 20, 30 and 40 are associated with a first WSS, which functions as an N×1 which, where in this example N=3. That is, in this first WSS optical port 40 serves as a designated output port to which wavelengths received by any of the optical ports 10, 20 and 30 can be selectively directed. In FIG. 5 a wavelength received by optical port 10 is shown being directed to optical port 40.

Likewise, optical ports 50, 60, 70 and 80 are associated with a second WSS, which functions as 1×N switch. That is, in this second WSS optical port 80 serves as a designated input port that can selectively direct wavelengths to any of the optical ports 50, 60 and 70. In FIG. 5 a wavelength received by optical port 80 is shown being directed to optical port 50.

For clarity of illustration in FIG. 5 the walkoff crystal 50, first composite half wave-plate 60, polarizer 70, Faraday rotator 80 and the second composite half wave-plate 90 associated with the first WSS are shown as separate elements from the walkoff crystal 50, first composite half wave-plate 60, polarizer 70, Faraday rotator 80 and the second composite half wave-plate 90 associated with the second WSS. However, as noted above, both the first and second WSSs may share a common set of such elements.

It should be noted that while the two WSSs in FIG. 5 are depicted as having four optical ports each, more generally any number of ports may be employed, and this number may be the same or different among the two functional switching elements. Moreover, in other embodiments the functionality of more than two WSSs may be incorporated into the same physical device.

In order to provide the proper directionality needed to achieve the desired coupling between the optical ports 10, 20, 30 and 40 of the first WSS, a half wave-plate 85 is inserted in the optical path between the optical ports 10, 20, 30 and 40 and the spatial light modulator 73 (e.g., an LCoS). In this example the half wave-plate 85 is located between the second composite half-wave plate 90 and the spatial light modulator 85. The operation of the first WSS is illustrated in FIG. 5 by an optical beam that is received by optical port 10 and directed to optical port 40. As shown, the optical beam originating from optical port 10 traverses the optical arrangement as previously described with its two components exiting the second half-wave plate region 94 in the vertical polarization state. The half wave-plate 85 then rotates the two components to the horizontal polarization state. The horizontally polarized components are received by the spatial light modulator 73, which directs them toward the output port 40. Upon receiving the horizontally polarized components from the spatial light modulator 73, the half wave-plate 85 rotates their polarizations to the vertical polarization state, after which the components traverse the remaining optical elements as described above. Optical beams directed from optical ports 20 and 30 to the designated output port 40 traverse the optical arrangement in a manner similar to that described above for the optical beam directed from optical port 10 to optical port 40.

In order to provide the proper directionality needed to achieve the desired coupling between the optical ports 50, 60, 70 and 80 of the second WSS, a second polarizer 87 is inserted in the optical path between the optical ports 50, 60, 70 and 80 and the spatial light modulator 73. The second polarizer 87 only allows horizontally polarized light to pass therethrough. The operation of the second WSS is illustrated in FIG. 5 by an optical beam that is received by optical port 80 and directed to optical port 50. As shown, the optical beam originating from optical port 80 traverses the optical arrangement as previously described with its two components exiting the first half-wave plate region 92 in the horizontal polarization state. The horizontally polarized components then traverse the second polarizer 87 unaffected since the second polarizer is horizontally polarized. The horizontally polarized components are received by the spatial light modulator 73 and directed toward output port 50. The second polarizer 87 receives the redirected components from the spatial light modulator 73 and once again allows them to pass therethrough unaffected, after which the components traverse the remaining optical elements as described above. Optical beams directed from optical port 80 to either of the optical ports 60 and 70 traverse the optical arrangement in a manner similar to that described above for the optical beam directed from optical port 80 to optical port 50.

Thus, in the embodiment described above in connection with FIG. 5, optical beams received by the spatial light modulator 73 from either of the two WSSs are in the same (e.g., horizontal) polarization state.

Figure 6:
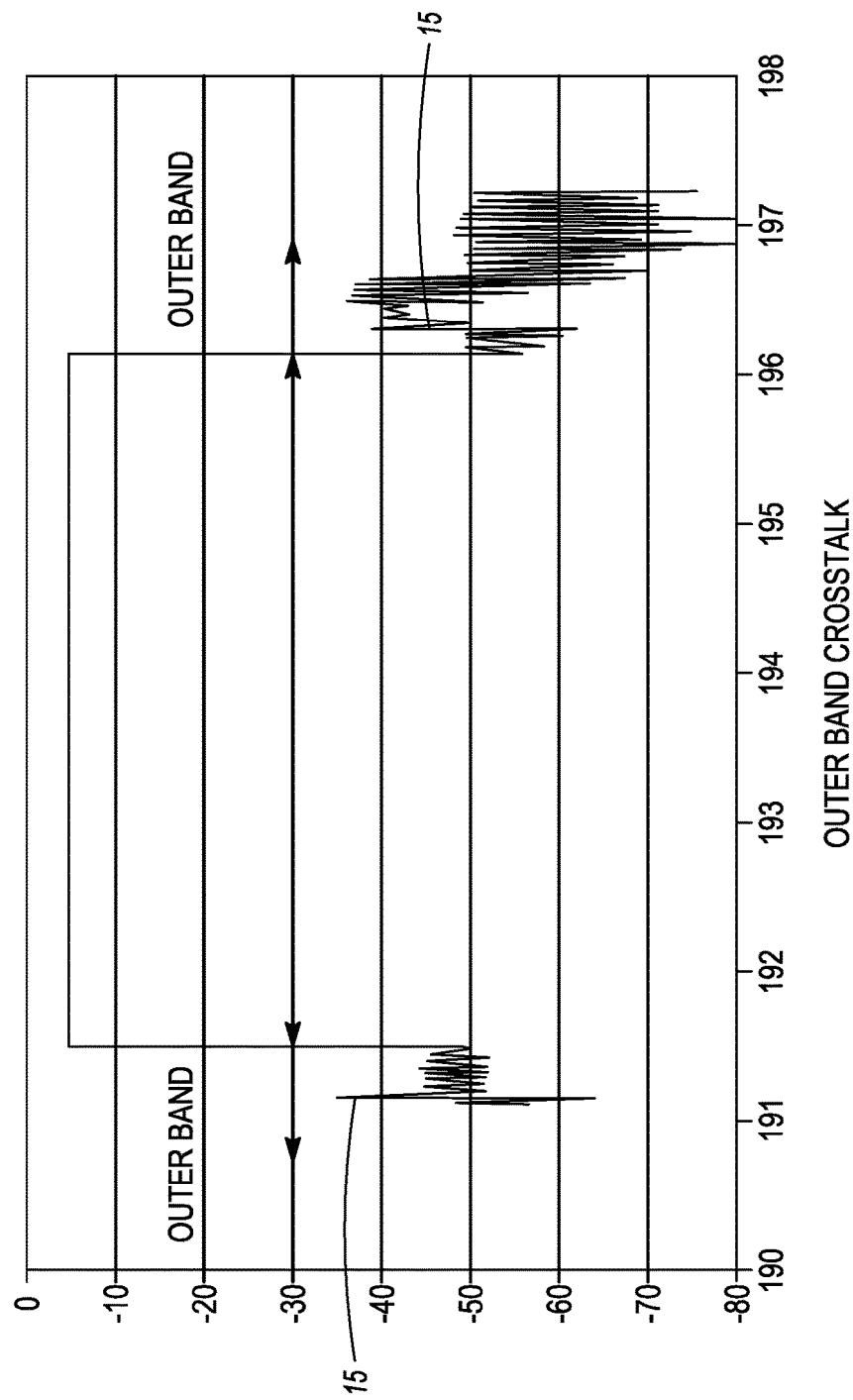
FIG. 6 shows the full spectral bandwidth of an optical device that employs an LCoS as the switching element, illustrating outerband crosstalk.

One problem that may occur in any of the embodiments described above arises from outer band crosstalk. Such crosstalk is illustrated in the insertion loss trace of FIG. 6, which shows the full spectral bandwidth of an optical device that employs an LCoS as the switching element. In this example the spectral bandwidth over which the device operates is the C-band e.g., the wavelength range from 1530 nanometers (nm) to 1565 nm. Also shown in FIG. 6 is the outer band crosstalk 15. The source of this crosstalk is reflection of the optical beam received by an optical port from the portion of LCoS surface that is outside of the active area in which the liquid crystal pixels are located.

Figure 7:
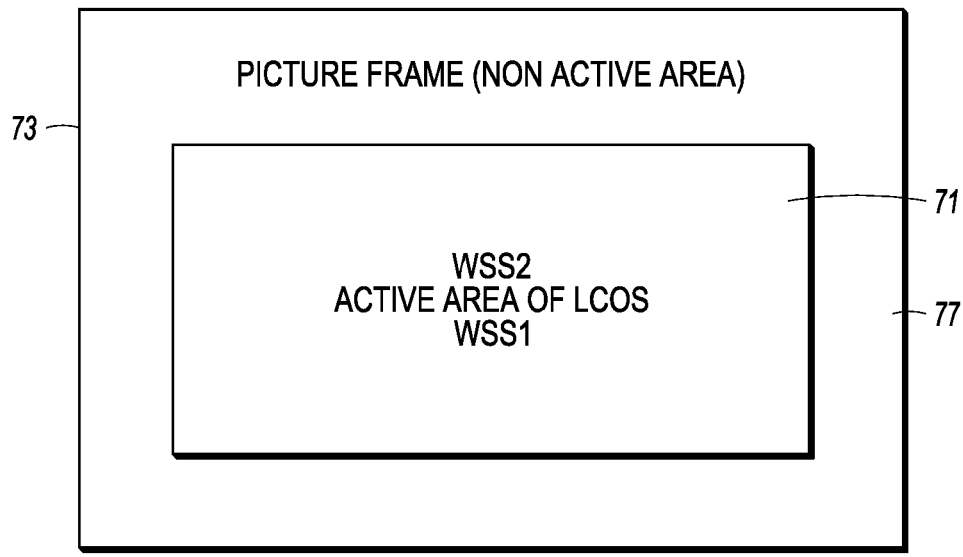
FIG. 7 shows a plan view of an LCoS, illustrating its active area and surrounding frame.
Figure 8:
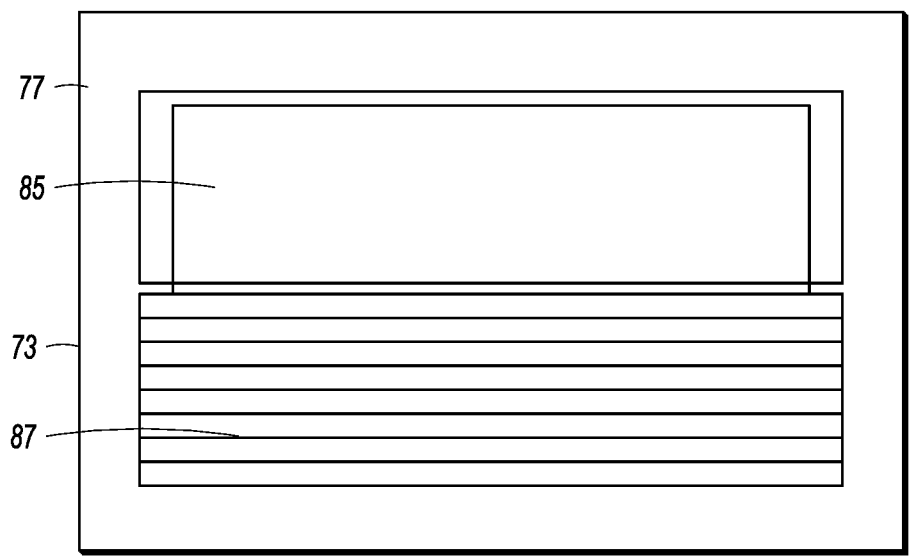
FIG. 8 shows plan view of an LCoS taken along lines I-I of FIG. 5.

FIG. 7 shows a plan view of an LCoS such as the LCoS 73 shown in FIG. 5. The LCoS 73 includes an active area 71 in which the liquid crystal pixels are located and a surrounding frame 77. FIG. 8 shows a similar plan view of the LCoS 73, except that FIG. 8 is taken along lines I-I of FIG. 5. In this way FIG. 8 shows the half wave-plate 85 located over the upper half of the active area 71 and the second polarizer 87 located over the bottom half of the active area 71. As mentioned above, outer band crosstalk arises from reflection of an input optical beam from the surrounding frame 77 of the LCoS surface. Since this crosstalk arises from a portion of the LCoS 73 outside of the active area 71, it cannot be suppressed by control of the liquid crystal pixels.

Figure 9:
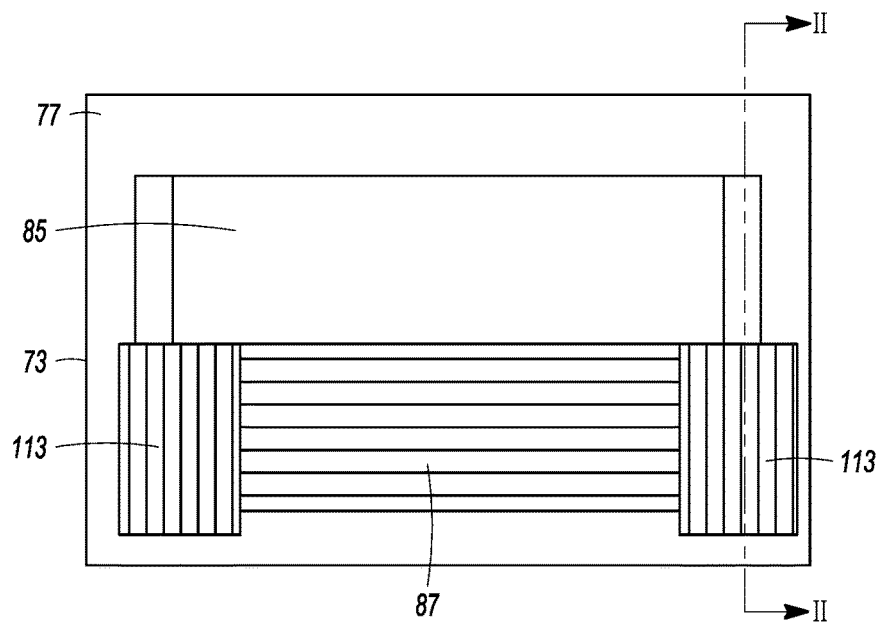
FIG. 9 shows a plan view of a polarization arrangement taken along lines I-I of FIG. 5.

To suppress the outerband crosstalk, in some embodiments a polarizer arrangement may be placed over the LCOS frame 77 to prevent any light from being reflected back from the frame 77 to the optical ports. That is, if, as in the implementation of FIG. 5, the optical beams reaching the LCoS 73 are in a first polarization state (e.g., the horizontal polarization state in FIG. 5), then the polarization arrangement located over the LCoS frame 77 should be in the orthogonal polarization state (e.g., the vertical polarization state in FIG. 5). Such a polarization arrangement is shown in FIG. 9, which similar to FIG. 8, is taken along lines I-I of FIG. 5. In this embodiment vertical polarizers 113 are placed over the portion of the LCoS frame 77 adjacent to the active area of the LCoS 73 that is associated with the 1×N switch of FIG. 5. The vertical polarizers 113 may be located between the horizontal polarizer 87 and the LCoS 73 in the optical path between the optical ports 50, 60, 70 and 80 and the LCoS frame 77.

The vertical polarizers 113 shown in FIG. 9 suppress outerband crosstalk arising in the 1×N switch shown in FIG. 5. A similar pair of vertical polarizers may be placed over the portions of the LCoS frame 77 adjacent to the active area of the LCoS 73 that is associated with the N×1 switch shown in FIG. 5 to prevent outerband crosstalk arising in the N×1 switch. In general, if the optical device incorporates the functionality of two or more WSSs, polarizers may be provided over the LCoS frame to suppress the outerband crosstalk in all of the WSS or any desired subset of the WSSs. If the optical device incorporates only a single WSS that employs the entirety of the active area of the LCoS, then the polarizers that are used to suppress the outerband crosstalk may be placed over all of the LCoS frame.

In the examples described above in which the optical beams reaching the LCoS 73 are in the horizontal polarization state, the polarizers 113 used to suppress outerband crosstalk are in the vertical polarization state. More generally, if the optical beams reaching the LCoS are in the some arbitrarily selected first polarization state, then the polarizers used to suppress outerband crosstalk should be in the orthogonal polarization state.

In some embodiments the polarizers used to suppress outerband crosstalk may overlap with the edge of the active area of the LCoS. This is illustrated for the vertical polarizers 113 shown in FIG. 9. In one illustrative example, the overlap may extend about 10 pixels (about 80 microns) into the active area 71 of the LCoS 73.

Figure 10:
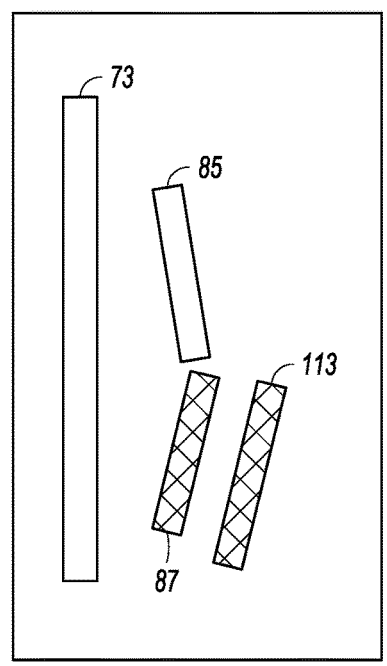
FIG. 10 shows one embodiment of the optical device taken along line II-II of FIG. 9.

FIG. 10 shows one embodiment of the optical device taken along line II-II of FIG. 9. As shown, in this embodiment the optical axis of the half wave-plate 85, the horizontal polarizer 87 and the vertical polarizers 113 from an oblique angle with respect to the plane of the LCoS 73 in order to avoid generating additional $0^{th}$ order crosstalk. In some embodiments such as that shown in FIG. 10 the half wave-plate 85 and the horizontal polarizer 87 may be positioned so that they define oppositely directed oblique angles with respect to the plane of the LCoS 73. Moreover, as further shown in FIG. 10, the plane of the vertical polarizers 113 associated with the 1×N WSS may be parallel to the plane of the horizontal polarizer 87. If additional polarizers are provided to suppress outerband crosstalk in the N×1 WSS, these polarizers may be parallel to the plane of the half wave-plate 85.

Figure 11:
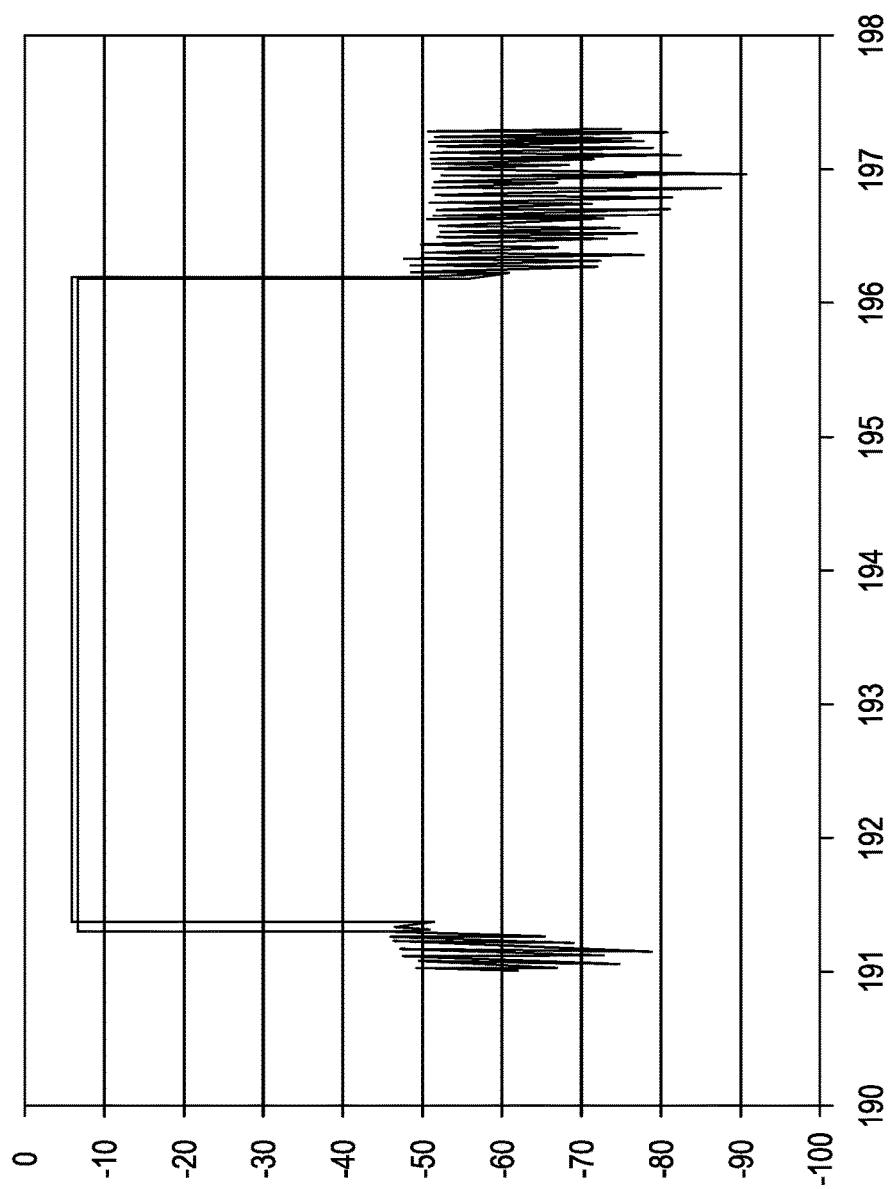
FIG. 11 shows an insertion loss trace similar to the trace of FIG. 6 after polarizers have been incorporated to reduce outerband crosstalk.

FIG. 11 shows an insertion loss trace similar to the trace of FIG. 6 after the polarizers have been incorporated to reduce outerband crosstalk. As shown the outerband crosstalk has been largely eliminated.

Figure 12A:
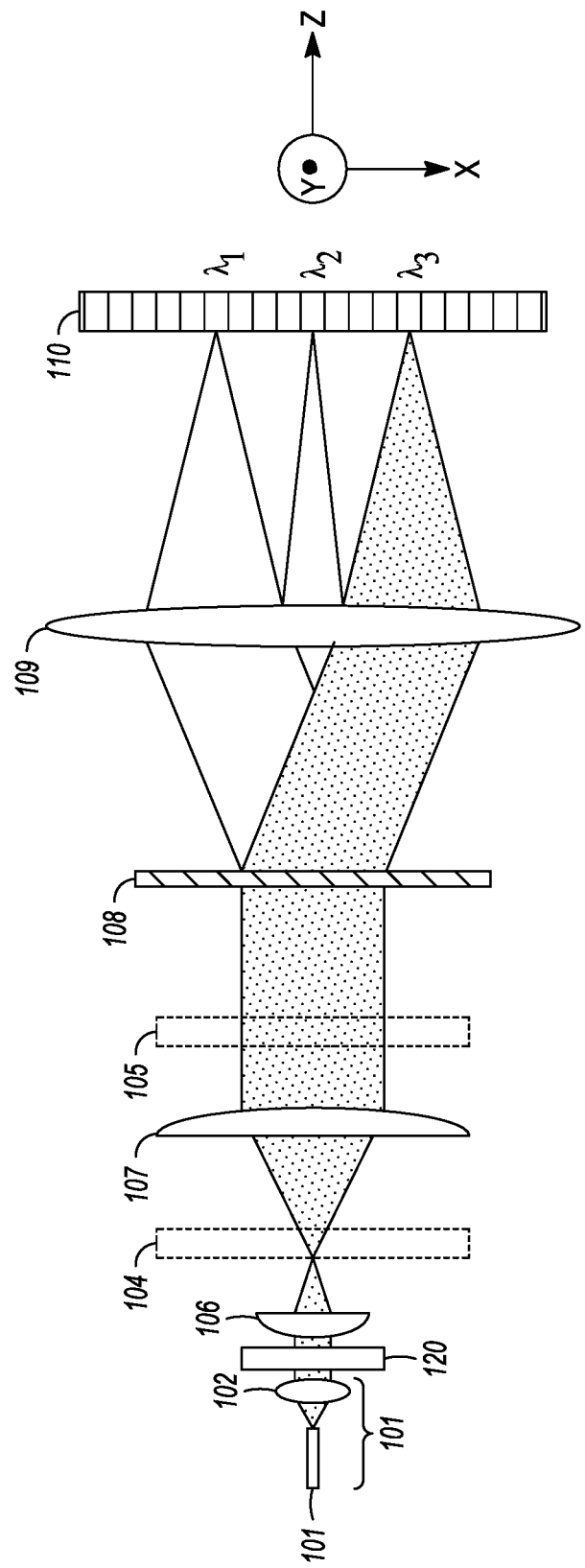
FIGS. 12A and 12B are top and side views respectively of one example of a simplified optical device such as a free-
Figure 12B:
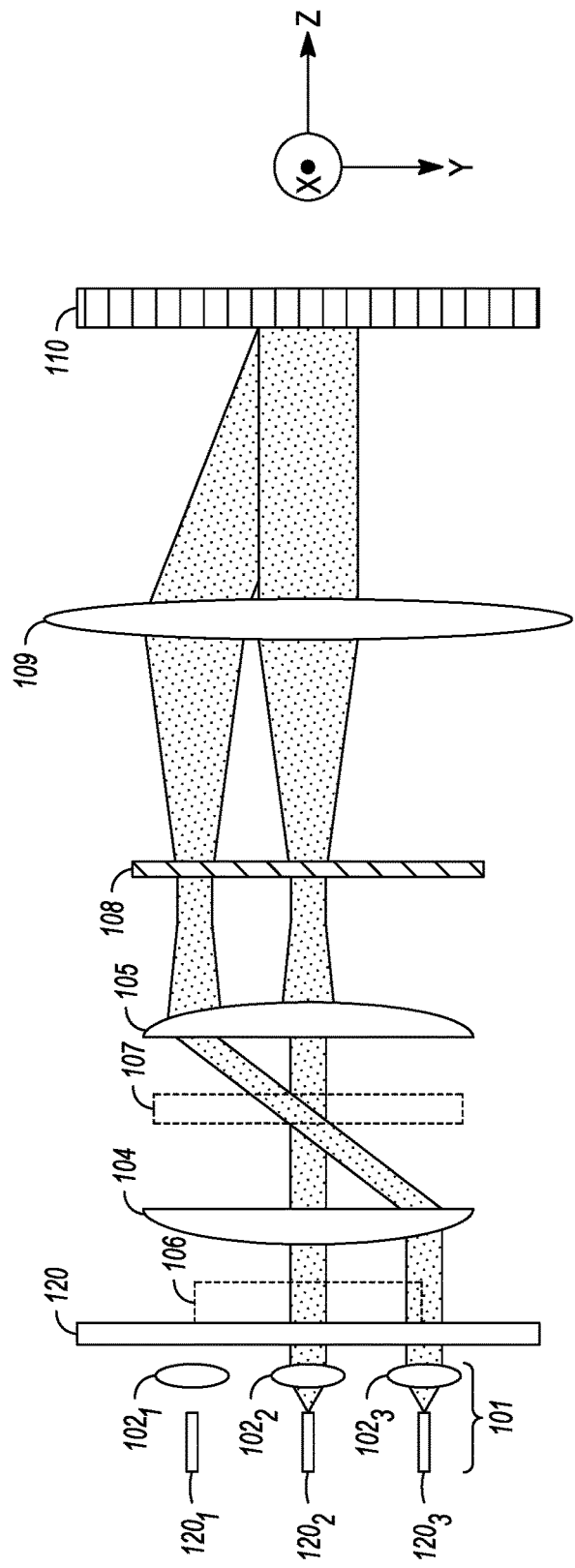

FIGS. 12A and 12B are top and side views respectively of one example of a simplified optical device such as a free-space WSS 100 that may be used in conjunction with embodiments of the present invention. Light is input and output to the WSS 100 through optical waveguides such as optical fibers which serve as input and output ports. As best seen in FIG. 12B, a fiber collimator array 101 may comprise a plurality of individual fibers $120_1$, $120_2$ and $120_3$ respectively coupled to collimators $102_1$, $102_2$ and $102_3$. Light from one or more of the fibers 120 is converted to a free-space beam by the collimators 102. The light exiting from port array 101 is parallel to the z-axis. While the port array 101 only shows three optical fiber/collimator pairs in FIG. 12B, more generally any suitable number of optical fiber/collimator pairs may be employed.

Optical arrangement 120 receives the light exiting from the port array 101 and directs the light toward the pair of telescopes described below. Optical arrangement 120 may be an optical isolator of the type described above in connection with FIG. 1, 4 or 5.

A pair of telescopes or optical beam expanders magnifies the free space light beams from the port array 101. A first telescope or beam expander is formed from optical elements 106 and 107 and a second telescope or beam expander is formed from optical elements 104 and 105.

In FIGS. 12A and 12B, optical elements which affect the light in two axes are illustrated with solid lines as bi-convex optics in both views. On the other hand, optical elements which only affect the light in one axis are illustrated with solid lines as plano-convex lenses in the axis that is affected. The optical elements which only affect light in one axis are also illustrated by dashed lines in the axis which they do not affect. For instance, in FIGS. 12A and 12B the optical elements 102, 108, 109 and 110 are depicted with solid lines in both figures. On the other hand, optical elements 106 and 107 are depicted with solid lines in FIG. 12A (since they have focusing power along the y-axis) and with dashed lines in FIG. 12B (since they leave the beams unaffected along the x-axis). Optical elements 104 and 105 are depicted with solid lines in FIG. 12B (since they have focusing power along the x-axis) and with dashed lines in FIG. 12A (since they leave the beams unaffected in the y-axis).

Each telescope may be created with different magnification factors for the x and y directions. For instance, the magnification of the telescope formed from optical elements 104 and 105, which magnifies the light in the x-direction, may be less than the magnification of the telescope formed from optical elements 106 and 107, which magnifies the light in the y-direction.

The pair of telescopes magnifies the light beams from the port array 101 and optically couples them to a wavelength dispersion element 108 (e.g., a diffraction grating or prism), which separates the free space light beams into their constituent wavelengths or channels. The wavelength dispersion element 108 acts to disperse light in different directions on an x-y plane according to its wavelength. The light from the dispersion element is directed to beam converging optics 109.

Beam converging optics 109 couple the wavelength components from the wavelength dispersion element 108 to a programmable optical phase modulator, which may be, for example, a liquid crystal-based phase modulator such as a LCoS device 110. The wavelength components are dispersed along the x-axis, which is referred to as the wavelength dispersion direction or axis. Accordingly, each wavelength component of a given wavelength is focused at least in the x-direction on an array of pixels. In other implementations beam converging axis may focus each wavelength component in both the x and y directions. By way of example, and not by way of limitation, three such wavelength components having center wavelengths denoted $\lambda_1$, $\lambda_2$ and $\lambda_3$ are shown in FIG. 12A being focused on the LCoS device 110 along the wavelength dispersion axis (x-axis).

As best seen in FIG. 12B, after reflection from the LCoS device 110, each wavelength component can be coupled back through the beam converging optics 109 (an optical power element), wavelength dispersion element 108 and optical elements 106 and 107 to a selected fiber in the port array 101.

If the vertical polarizers 113 used to suppress outerband crosstalk are employed, in one embodiment they may be located between the beam converging optics 109 and the LCoS device 110. In some cases the vertical polarizers 110 may even be adjacent to and in contact with the frame of the LCoS device 110.

The above examples and disclosure are intended to be illustrative and not exhaustive. These examples and description will suggest many variations and alternatives to one of ordinary skill in this art.

The invention claimed is:

1. An optical device, comprising:
at least three optical ports;
an optical arrangement for arranging an optical beam received from any of the optical ports into a first polarization state;
a dispersion element for spatially separating the optical beam into a plurality of wavelength components;
an optical power element for converging each of the plurality of wavelength components in at least one direction; and
a programmable optical phase modulator for receiving the focused plurality of wavelength components in the first polarization state, the modulator being configured to steer the wavelength components through the optical arrangement, the dispersion element and the focusing element to a selected one of the optical outputs, the programmable optical phase modulator including an active area that performs the steering and a non-active area surrounding the active area; and
a polarizing arrangement located in an optical path between at least one of the optical ports and at least a portion of the non-active area of the programmable optical phase modulator, the polarizing arrangement being configured to arrange optical energy into a second polarization state orthogonal to the first polarization state.

2. The optical device of claim 1, wherein the at least three optical ports includes a first set of optical ports associated with functionality of a first wavelength selective switch and a second set of optical ports associated with functionality of a second wavelength selective switch, wherein the polarizing arrangement is located in an optical path between the first set of optical ports and the portion of the non-active area of the programmable optical phase modulator.

3. The optical device of claim 2, wherein the optical arrangement includes a polarizer located in the optical path of one of the first and second set of optical ports and a half wave-plate located in the other of the first second set of optical ports.

4. The optical device of claim 3, wherein the first wavelength selective switch is arranged to function as an N×1 switch having N input optical ports, N>2, and 1 output optical port and the second wavelength selective switch is arranged to function as a 1×M switch having 1 input optical port and M output ports, M>2.

5. The optical device of claim 1, wherein the polarization arrangement has an optical axis that defines an oblique angle with respect a plane of the programmable optical phase modulator.

6. The optical device of claim 1, wherein the at least three optical ports includes at least one optical input port for receiving the optical beam and a plurality of optical output ports, the optical arrangement being further configured to allow optical coupling between the optical input port and each of the optical output ports and preventing optical coupling between any one of the plurality of optical output ports and any other of the plurality of optical output ports.

7. The optical device of claim 1, wherein the optical arrangement is further configured to selectively allow and prevent optical coupling between selected ports by discriminating among different polarization states of optical energy traversing therethrough.

8. The optical device of claim 1, wherein the optical arrangement includes: at least one walkoff crystal for spatially separating the optical beams received from any of the ports in optical port array into first and second optical components being arranged in the first and second polarization states, respectively; a first composite half-wave plate for arranging the first optical components into the second polarization state; a polarizer for transmitting optical energy in the second polarization state but not the first polarization state; a Faraday rotator and a second composite half-wave plate, the Faraday rotator and the second composite half-wave plate rotating the spatially separated optical beams received from the optical input port via the polarizer into the first polarization state and rotating the spatially separated optical beams received from the plurality of optical output ports into the second orthogonal polarization state.

9. The optical device of claim 1, wherein the programmable optical phase modulator includes a liquid crystal-based phase modulator.

10. The optical device of claim 9, wherein the liquid crystal-based phase modulator is a LCoS device.

11. The optical device of claim 9, wherein the dispersive element is selected from the group consisting of a diffraction grating and a prism.

12. The optical device of claim 9, further comprising an optical system for magnifying the optical beam received from the optical port array and directing the magnified optical beam to the dispersion element.

13. The optical device of claim 12, wherein the optical system has a first magnification factor in a first direction and a second magnification factor in a second direction orthogonal to the first direction, the first magnification factor being different from the second magnification factor.

14. The optical device of claim 13, wherein the first direction is parallel to a wavelength dispersion axis along which the optical beam is spatially separated, the first magnification factor being less than the second magnification factor.

* * * * *